United States Patent
Coln et al.

(10) Patent No.: US 8,027,421 B2
(45) Date of Patent: Sep. 27, 2011

(54) SERIAL DIGITAL DATA COMMUNICATION INTERFACE FOR TRANSMITTING DATA BITS EACH HAVING A WIDTH OF MULTIPLE CLOCK CYCLES

(75) Inventors: Michael C. W. Coln, Lexington, MA (US); Alain Guery, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 1009 days.

(21) Appl. No.: 11/903,529

(22) Filed: Sep. 21, 2007

(65) Prior Publication Data

US 2008/0123790 A1  May 29, 2008

Related U.S. Application Data

(60) Provisional application No. 60/846,177, filed on Sep. 21, 2006.

(51) Int. Cl.
*H04L 7/00* (2006.01)
(52) U.S. Cl. .......................................... 375/355; 375/358
(58) Field of Classification Search .................. 375/355, 375/358; 327/141
See application file for complete search history.

(56) References Cited

U.S. PATENT DOCUMENTS

| | | | | |
|---|---|---|---|---|
| 4,965,884 A | * | 10/1990 | Okura et al. | 375/354 |
| 2002/0122514 A1 | | 9/2002 | Hofmann et al. | |
| 2002/0141515 A1 | * | 10/2002 | Enam et al. | 375/340 |
| 2002/0144189 A1 | | 10/2002 | Chen | |
| 2003/0067937 A1 | * | 4/2003 | Kim | 370/438 |
| 2005/0155085 A1 | * | 7/2005 | Thaly et al. | 725/136 |
| 2005/0169413 A1 | | 8/2005 | Van Der Putten et al. | |
| 2005/0237098 A1 | * | 10/2005 | Park | 327/291 |
| 2008/0059667 A1 | * | 3/2008 | Berenbaum et al. | 710/110 |

FOREIGN PATENT DOCUMENTS

| | | |
|---|---|---|
| EP | 0738057 | 10/1996 |
| EP | 1434382 | 6/2004 |
| WO | WO 96/28779 | 9/1996 |

OTHER PUBLICATIONS

PCT/US2007/020526, International search report and written opinion, Mar. 5, 2008.

* cited by examiner

*Primary Examiner* — Dac Ha
*Assistant Examiner* — Brian J Stevens
(74) *Attorney, Agent, or Firm* — Kenyon & Kenyon LLP

(57) ABSTRACT

A serial protocol and interface for data transmission from a data transmitter 12 to a data receiver 14 where the propagation delay may be up to several clock cycles long and may be varying slowly. The data receiver provides a clock to the data transmitter. A synchronization signal provided by either the receiver or the transmitter initiates a frame of data transmission at a transfer rate controlled by the clock. The synchronization signal coordinates the transmission of a data header followed by a predetermined number of data bits, known as the frame length. The data receiver uses the header bits to determine the times to sample the subsequent data bits. The length of the frame is limited to provide sufficient likelihood the propagation delay line characteristics have not changed enough to cause a bit error. The system resynchronizes at the beginning of each frame.

18 Claims, 8 Drawing Sheets

SERIAL DIGITAL DATA COMMUNICATION INTERFACE FOR TRANSMITTING DATA BITS EACH HAVING A WIDTH OF MULTIPLE CLOCK CYCLES

CROSS-REFERENCE TO RELATED APPLICATION

This application claims the benefit under 35 USC 119(e) of provisional application Ser. No. 60/846,177, filed Sep. 21, 2006, and titled "Digital Data Communication For Data Converters," which is hereby incorporated by reference.

FIELD OF INVENTION

The present invention relates to the field of serial communication interfaces and to a method for providing data transmission at high rates between transmitting and receiving devices in the presence of propagation delay in the channel between them.

BACKGROUND

In general, data transmitters (i.e., devices having digital data outputs) need to deliver digital data to other devices (i.e., data receivers), often at high rates and often over serial communication channels. Frequently, the clock rates (speeds) used for communication between devices is sufficiently high that propagation delay issues exist. Unknown, varying or excessive propagation delays pose a challenge with respect to synchronizing receivers and transmitters, maintaining synchronization, and with respect to reliably transmitting digital data. The serial communications protocol used in such environments, as well as the apparatus and methods for implementing such protocol, must incorporate a propagation delay-tolerant approach to synchronization between transmitter and receiver. Furthermore, the apparatus and method must be tolerant to signal dispersion and variations in signal generation.

Currently, the clock speed for communication between devices on separate chips is typically about 125 MHz, while a speed of about 375 MHz might be used when the devices are on the same chip. Faster speeds are likely in the future. At these speeds, the devices must accommodate a considerable amount of variability in signal propagation delays. Differences and changes in signaling delay may be caused, for example, by variations inherit to the fabrication process, time-varying environmental conditions, power supply variations, and other factors.

Because cost is an important consideration for commercial products, the need exists for a serial communications protocol and interface that is compatible not just with high-priced products, but also with lower cost products such as low-cost field programmable gate arrays (FPGAs) which are often used to implement devices such as transmitters and receivers in digital systems.

A need also exists for an interface and interfacing method which permits serial data communications in which a transmitter can adjust its transmission rate to that a receiver can accept.

SUMMARY

These needs are addressed by a serial protocol and interface for communicating between one or more data transmitters and a data receiver accommodating channel propagation delay, and slow variations therein. The protocol requires three logical channels between the data receiver and data transmitter: a clock channel, a synchronization channel, and a data channel. As illustrated, each of the logic channels is provided by a separate physical channel of one or more conductors, but as envisioned, other implementations are possible.

On the clock channel, a clock signal, CLK, supplied by the data receiver is provided to the data transmitter. On the synchronization channel, a synchronization signal, SYNC, supplied by the data receiver, is used to request transmission of a frame (i.e., a data transmission unit) by the data transmitter. In some other embodiments, the receiver does not request a frame and transmission of SYNC is from the data transmitter to the data receiver, indicating the transmission of a frame. Finally, on the data channel, a data signal, DOUT, is transmitted from the data transmitter to the data receiver.

A frame is the time period during which a header and/or data is being transmitted on the data channel. The frame length, which is the total number of bits to be transmitted during a frame, is agreed upon by the devices (i.e., their design) a priori, or determined by either the data transmitter or data receiver. A request for (i.e., to begin) a new frame is transmitted by the data receiver (and received by the date transmitter) on the synchronization channel. When no data is being transmitted (i.e., at a time other than during a frame), the synchronization channel is monitored by the data transmitter and when a synchronization signal is read by the data transmitter, it is determined that a new frame has been requested by the data receiver.

When a request for a new frame has been received, header bits followed by a predetermined number of data bits are transmitted serially over the data channel from transmitter to receiver. The bit transmission rate, using the clock signal from the receiver, should be no faster than about one-third the clock rate to insure accurate data detection by the receiver.

The data receiver monitors the data channel after a request for a new frame and first detects the header bits. The header bits are used by the data receiver to determine the sampling times for the subsequent bits. At the completion of the frame the data signal is set to a predetermined idle state.

The invention has several aspects which may be implemented or practiced either alone or in combination with other aspects. According to a first aspect, a method is provided for serial communication of binary signals between a data transmitter and a data receiver, the binary signals varying between a first logic level representing a first binary value and a second logic level representing a second binary value. In this method, a clock signal is transmitted from the data receiver to the data transmitter at a predetermined clock rate. A synchronization signal is transmitted from the data receiver to the data transmitter. Transmission of a frame is initialized in response to the synchronization signal. A binary data signal is transmitted at a predetermined nominal bit rate from the data transmitter to the data receiver upon initialization of the frame, said data signal including a header code, followed by a plurality of data bits. Following initializing the frame, said binary data signal is received at the receiver and the header code is detected. In response to the header code detection, data bit sampling times are determined for the remaining data bits in the frame; and at the data receiver, the logic value of each said data bit is determined at said data bit sampling times.

The predetermined nominal bit rate used for data transmission preferably is one-third the clock rate, or less.

Initializing transmission of a frame in response to the synchronization signal may include detecting a change in the logic level of the synchronization indicative of a request to initialize a frame. A frame may be terminated upon detecting a further change of the logic level of the synchronization signal.

Frame length may be fixed or variable. In the case of variable frame length, the data signal may includes an encoded frame length within or after the header code.

Detecting the header code at the data receiver may comprise sampling the header code at a rate at least three times the nominal bit rate; counting the number of samples indicative of detection of a first header bit; and in response to said count, establishing sampling times for remaining data bits in the frame.

Detecting the header code at the data receiver may comprise producing a plurality of additional, phase-shifted counterparts of a master clock having a clock rate equal to the data bit rate; sampling the data signal on the master clock and each phase-shifted counterpart thereof; and selecting either the master clock or one of the additional counterpart clocks to specify said data bit sampling times for subsequent data bits in the frame and sampling data bits at said times.

In some embodiments, such method may further comprise receiving a clock signal, referred to as the external clock signal, from an external source; determining if the clock rate of the external clock signal exceeds a predetermined minimum rate and if so, reproducing the external clock signal as an internal clock signal for use in the receiver, and otherwise producing an internal clock signal for use in the receiver by generating a clock signal whose rate exceeds said predetermined minimum rate; and using the internal clock signal in producing the clock signal transmitted to the transmitter.

According to another aspect, a data receiver is provided for receiving a serial communication of binary signals in a frame from a data transmitter (said frame including one or more header bits and one or more data bits) and for decoding the received binary signals into binary data to determine the bits that were transmitted. Such a receiver may comprise a clock generator which provides a clock signal to the transmitter; a synchronization signal source which provides to the transmitter a synchronization signal for initiating a frame; a state machine that receives the serial communication, detects a header code, determines data bit sampling times for sampling the serial communication to decode the data bits thereof, and samples at the data bit sampling times, the logic level of the received serial communication and provides corresponding data bit values, wherein the state machine determines data bit sampling times by selecting a sampling time from among a finite plurality of potential sample times, to sample proximate the nominal middle of a received bit value.

In some embodiments, the clock generator provides the clock signal at least three times the a bit rate at which the transmitter transmits bits in the serially communicated binary signals.

As well, in some embodiments, the synchronization signal source requests a frame from the transmitter by changing a logic level of the synchronization signal.

The synchronization signal source may request a frame from the transmitter by changing the synchronization signal from a first logic level to a second logic level, and the termination of the frame may be requested by changing the synchronization signal from the second logic level to the first logic level.

In some embodiments, the state machine is adapted to sample the received serial communication each clock cycle of a master clock, count the number of detections of the first header bit; and determine therefrom the data bit sampling times.

To detect the header code, the state machine may be adapted to produce additional clocks by phase shifting a master clock with a clock speed equal to the data bit rate; sample the data signal on each clock; and select either the master clock or one of the additional clocks to specify the data bit sampling times.

According to another aspect, instead of the receiver providing a synchronization signal to the transmitter, the transmitter may include a synchronization signal generator which provides a synchronization signal to the receiver, to indicate that a frame will follow. For example, the transmitter may include a timing circuit for generating periodic synchronization signals.

In still other aspects or embodiments, the serial communication stream is sampled multiple times during the duration of each nominal data bit cell, with each sample being stored in a register or other temporary storage device, and then just one of those multiple samples proximate the nominal middle of a data bit cell is selected as the received data bit value. Consequently, a receiver for implementing such a method comprises another aspect of the invention, including apparatus for obtaining the multiple samples and apparatus for selecting from among the samples one which is proximate the nominal middle of the bit cell. For example, such multiple samples may be obtained using three (or more) master clocks, phase-shifted relative to one another).

Another aspect is a transmitter which receives a clock at a first rate, assembles a data frame and transmits it at a rate no greater than one-third the first rate, commencing in response to a synchronization signal.

BRIEF DESCRIPTION OF THE DRAWINGS

The invention and embodiments thereof will be better understood when the following detailed description is read in conjunction with the accompanying drawing figures. In the figures, elements are not necessarily drawn to scale. In general, like elements appearing in multiple figures are identified by a like reference designation. In the drawings.

DETAILED DESCRIPTION

A serial communications interface and protocol is described for communication between a data transmitter and data receiver whereby data is transmitted in frames of specified length such that synchronization is required only periodically. The approach is tolerant of propagation delay and variations in bit edge timing.

Figure 1:
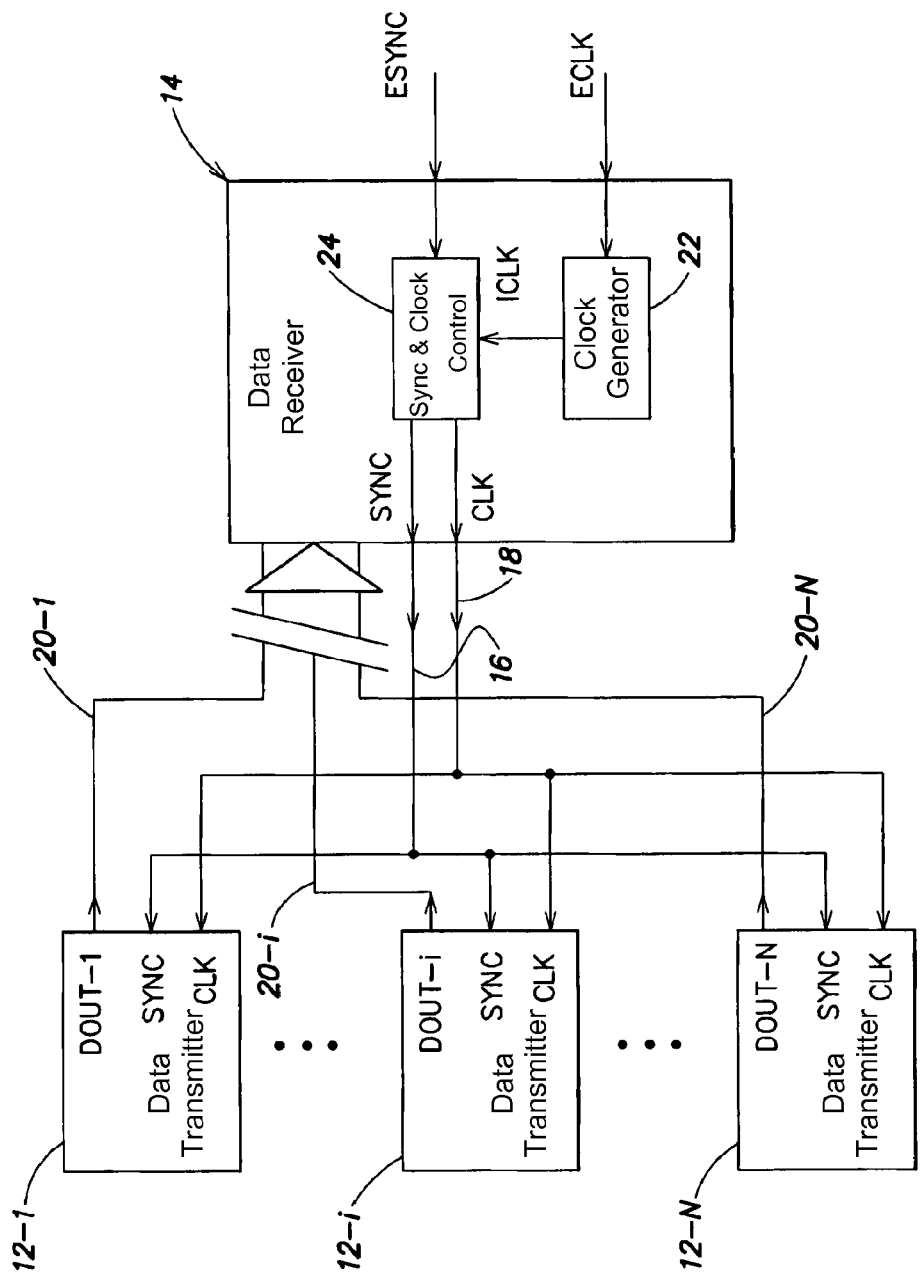
FIG. 1 is a simplified block diagram of an illustrative embodiment of apparatus for practicing aspects of the invention, portraying a plurality of data transmitters and data receivers and a communications interface therebetween, according to the concepts taught herein.

Referring to FIG. 1, data is transmitted from N data transmitters 12, where N is an integer, to a data receiver 14. (While multiple transmitters and a single receiver are shown, the invention is applicable as well to a single transmitter-single receiver environment and to a multiple transmitter—multiple receiver environment, of course.) Each data transmitter may be any of a number of devices which generate digital data output, such as analog-to-digital converters (ADCs), current-to-digital converters (IDCs), and the like. The individual data transmitters are numbered 12-i, where, index i ranges from 1 to N. Communication takes place over a synchronization channel 16, clock channel 18, and N data channels 20.

A typical data receiver may be implemented as a finite state machine (FSM), embodied in, for example, a field programmable gate array (FPGA), dedicated logic and other circuits, in a suitably programmed general or specially programmed microprocessor or microcontroller, or other form. Those skilled in the art know how to implement FSMs from a state description as provided herein.

Overview of the Operation of Data Receiver and Data Transmitter

A high-level overview of the operation of the data receiver and data transmitter are given presently.

Figure 2:
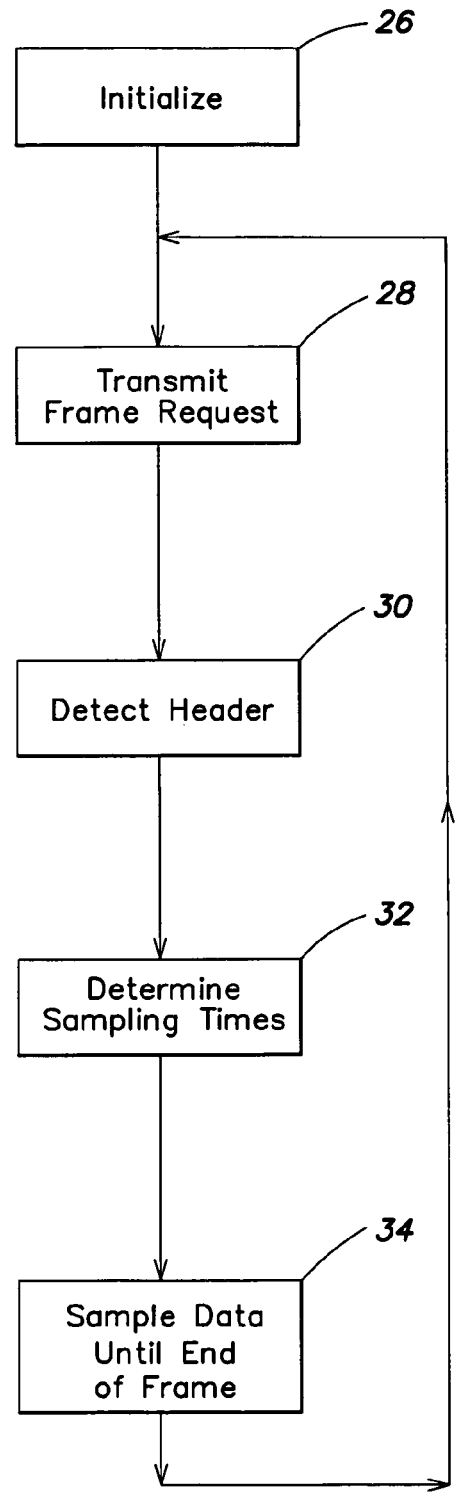
FIG. 2 is a flow chart describing the operation of the data receiver.

The operation of the data receiver is illustrated in FIG. 2. The initialization step 26 begins when the receiver is turned on or reset. The initialization step includes beginning transmission of the CLK signal to the transmitter and insuring that the SYNC signal is not requesting a frame. Master clock signals are generated internally to provide a set of potential sampling times for incoming data.

In step 28 a frame request is transmitted at the appropriate time. DOUT is then monitored for the data header (step 30). Once the data header has been detected, decision rule logic is applied to determine the data sampling times (step 32). Data is sampled at the appropriate sampling times until the end of the frame is reached (step 34). Operation then returns to step 28 in preparation for a new frame.

Figure 3:
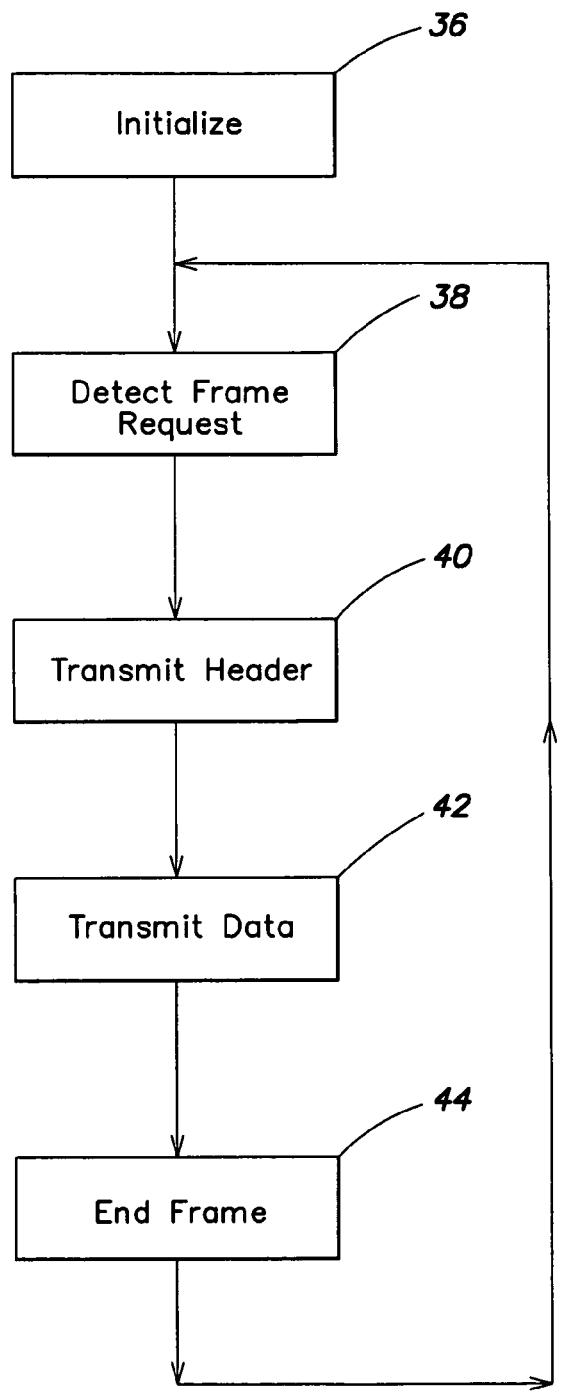
FIG. 3 is a flow chart describing the operation of the data transmitter.

The operation of the data transmitter is illustrated in FIG. 3. The initialization step 36 begins when the transmitter is turned on or reset. The initialization step includes setting DOUT to a predetermined idle value. At step 38 the transmitter monitors the synchronization channel for a request to transmit a frame. Upon receiving a frame request, the data header is written to DOUT at step 40, followed by the transmission data (step 42). At the end of the frame (step 44), completion steps, such as setting DOUT to the predetermined idle state, are taken. The transmitter then awaits a new frame request.

Communication Between Data Receiver and Data Transmitter

Binary (i.e., digital logic) signals are transmitted between the data transmitters and data receiver. Each signal may, at a given moment, be driven to a first logic level or to a second logic level by its transmitter. Without loss of generalization, and solely by way of example, we consider the case where the first logic level is "0," represented by a low level in FIGS. 4 and 5, and the second logic level is "1," represented by a high level in FIGS. 4 and 5. Those skilled in the art appreciating that the reverse case is also possible, as well as the use of multi-valued logic signals.

In an example embodiment, each data transmitter 12-i, is connected to the data receiver 14 by three logical channels, illustrated as embodied in three corresponding physical channels. Each of a synchronization signal, SYNC, and clock signal, CLK, is transmitted on its own corresponding channel (16, 18, respectively) from the data receiver 14 to the data transmitters 12, in parallel (though a parallel feed is not required). A data signal, DOUT-i, is transmitted on a third channel, 20-i, from the data transmitter 12-i to the data receiver 14. Thus in the example embodiment each data transmitter is connected to three channels, while the data receiver is connected to N+2 channels.

The clock signal keeps time for the data transmitter by alternating between 0 and 1 at a rate equal to twice the clock rate. Clock rate is the frequency of rising edges, which occur at the transitions from 0 to 1 on signal CLK. At the rising edge of CLK, the data transmitter performs operations such as data write operations. It is not required that the clock rate be constant, nor is it required that a particularly clock duty cycle, is used.

Inherently, there is some propagation delay in the transmission of the clock from the data receiver to the data transmitter and there is some delay between clock edges at the data transmitter and generation of data bits. Then there is a propagation delay from the transmitter to the receiver. It is this cumulative delay that must be addressed in order to time the sampling of received bits properly, to allow reliable detection/decoding of transmitted data.

In some embodiments, an external clock signal, ECLK, may be an input to the data receiver. A clock generator 22 in the data receiver 14 may reproduce the ECLK signal as an internal clock signal ICLK: or in another embodiment it may determine the frequency of ECLK, and if that frequency is below some threshold, increase the frequency to generate the ICLK signal, or otherwise reproduce the ECLK signal as ICLK. The Synchronization & Clock Control circuits 24 generates the clock signal CLK using ICLK.

In the simplest embodiment, circuit 24 acts as a pass through such that CLK is directly connected to ICLK. Embodiments where CLK consists of a series of bursts or pulses are also envisioned. Each burst includes a series of clock cycles, while in between bursts there are no clock cycles.

The synchronization signal is used by the receiver to request the transmission of a frame by the data transmitter. Many embodiments are possible. In the example embodiment, a 0 followed by a 1 on the synchronization channel signals a request for a frame. In another embodiment, a change in the value of the SYNC signal on consecutive reads (either from 0 to 1, or 1 to 0) indicates a request for a new frame. In some embodiments, an external synchronization signal, ESYNC, is an input to the data receiver that triggers the data receiver to request a frame. ESYNC is appropriately reproduced by the data receiver as the SYNC signal to request the initialization of a frame. Circuit 24 may reproduce the ESYNC signal as SYNC by directly connecting the two. In other embodiment, circuit 24 may derive or generate the SYNC signal from the ESYNC signal.

Figure 4:
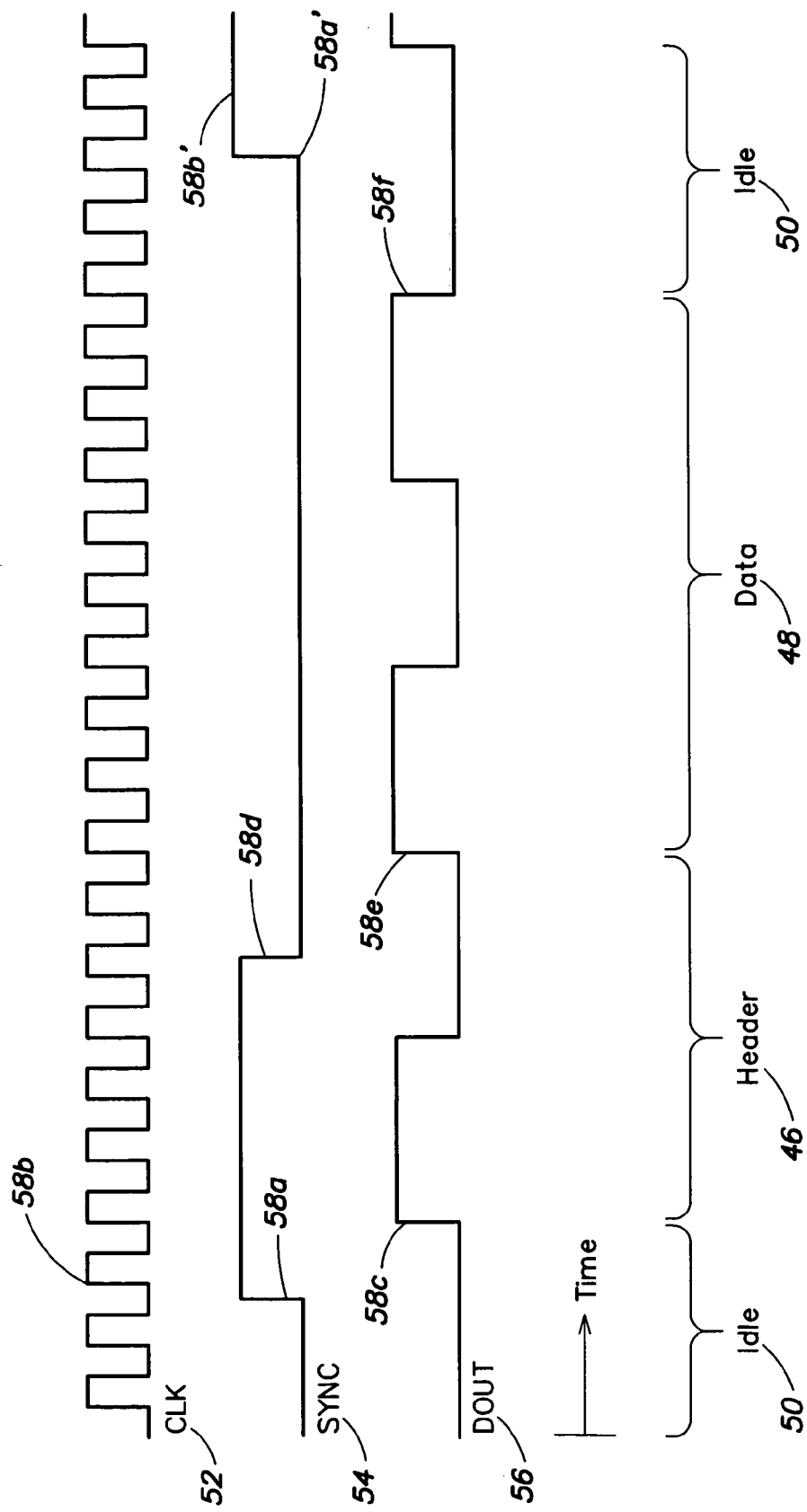
FIG. 4 is a set of waveforms illustrating the relationships between example clock, synchronization and data signals during the course of a frame, in an example embodiment.

Referring to FIG. 4, the data signal DOUT-i on channel 20-i transmits a frame's worth of information, which includes a header 46 followed by a number of data bits 48. An idle interval 50 separates successive frames, and may optionally be omitted. The total number of bits transmitted during a frame is referred to as the frame length. In some embodiments, the frame length is agreed upon by the data transmitters and the data receivers a priori. It may be a fixed number, for example, designed into the hardware and/or software of the transmitter and/or receiver.

A variable frame length also may be used. In an alternate embodiment, the SYNC signal may be used to request termination of a frame. For example, a change in the value of SYNC from 0 to 1 might request transmission of a frame, while a change from 1 to 0 might request termination of the frame. Some embodiments may use a footer code, transmitted after the data bits to avoid ambiguity as to the last data bit. When a variable length frame is employed, part of the header may be a series of bits containing an indication of the length of the frame, for example.

At the completion of a frame, the data signal preferably is set to an predetermined idle state (either 0 or 1).

Illustration of Transmission Protocol

To illustrate the transmission protocol, we consider a non-limiting example of signal relationships in FIG. 4, where the rate of the clock signal CLK 52 is maintained at a constant speed, the frame size is predetermined as five total bits (inclusive of header), and SYNC 54 initializes a frame by switching from 0 to 1. The frame header 46 in this example is a two-bit pattern comprising a 1 followed by a 0, the data signal predetermined idle state is 0, and the data bit rate is one bit per three clock cycles. The signals in FIG. 4 are shown as would be measured at the data transmitter. For simplicity, DOUT-i is written as DOUT 56 in this illustration.

In general the header maybe of any desired length. Other header patterns may be employed, of course, as those skilled in the art will appreciate. If desired, the choice of header pattern may be recorded in a register (not shown) provided for that purpose.

A conventional NRZ code is employed to transmit the data (with no Manchester coding), including the header bits. A "1" is signaled by the generation of a high level through an entire bit interval and a "0" is signaled by the generation of a low level through an entire bit interval. In the receiver, a state machine, as discussed above, operates according to the process described herein to deduce bit locations and values even in the face of some appreciable degree of time skew between the transmitted data signal and the receiver's clock signal. With a properly designed receiver, a factor of three (or more) between the receiver clock rate and the bit rate, and a periodic synchronization pattern in the form of the header pattern sent at the start of each frame, the system can accommodate significant propagation delay from receiver to transmitter and back, as well as propagation delays in the circuitry.

The example begins with the system in the idle state 50 with SYNC 54 and DOUT 56 both 0. At time 58a, the state of SYNC signal 54 changes from 0 to 1, indicating the data receiver has requested that a new frame begin. SYNC signal 54 is read at the next clock cycle at time 58b. The data transmitter recognizes this as a request for a new frame and begins transmitting a header code 46 on DOUT 56 on the next clock cycle (time 58c).

Data bits 48 follow, beginning at time 58e at a rate of one bit per three clock cycles. In this example, the frame size allows for three data bits, 48. The choice of the data bit sequence, 101, is illustrative. Notice that at time 58d, the SYNC signal returns to 0. In this example embodiment, this does not trigger a response by the data transmitter.

At time 58f, the predetermined number of data bits has been transmitted, and DOUT returns to the idle state in preparation for a new frame. A new frame request is sent at time 58a' and detected at time 58b'. Note that in this embodiment the frame request would not be detected unless SYNC is read as 0 on the previous bit.

Received Bit Sampling

Consider now how to sample received data bits which may arrive at times skewed from bit to bit and with respect to the clock signal, owing to propagation delay and its variability. This topic will be discussed with reference to FIG. 5 and associated Tables I and II.

The signal DOUT arrives at the data receiver after some (unknown, possibly somewhat uncontrollable and even variable) propagation delay. Preferably, the idle time between frames is at least two clock cycles long if the last data bit of the previous frame is a 1. This insures that the receiver reads a 0 immediately before the first header bit, allowing the data receiver to distinctly identify the start of the header. DOUT is read using a master clock for establishing sampling times.

Figure 5:
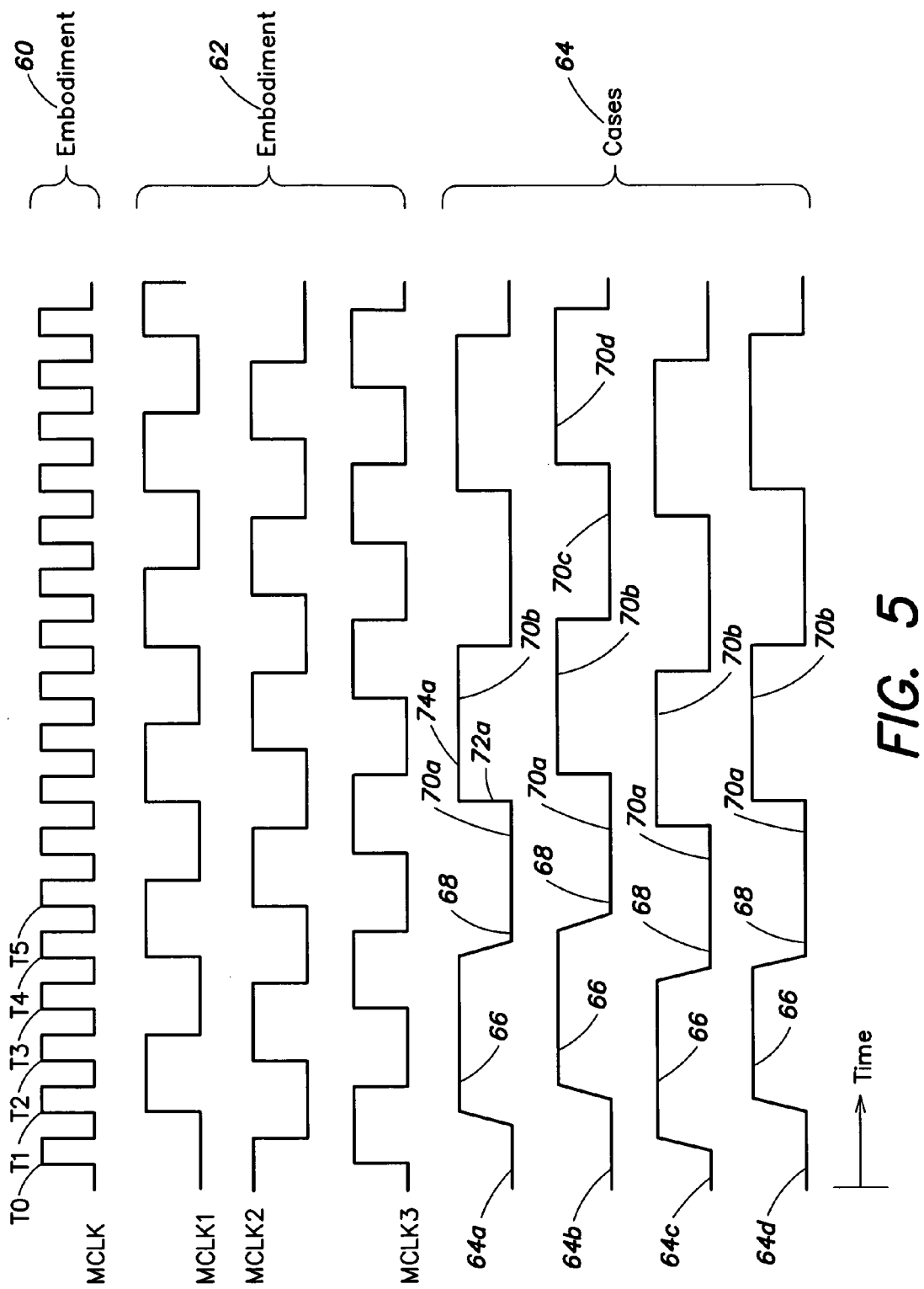
FIG. 5 is a set of waveforms and tables useful for illustrating two embodiments for the detection of the first header bit and application of the detection rules taught herein.

In example embodiment 60, indicated in FIG. 5, the master clock, MCLK, has the same clock rate as CLK. The MCLK cycles the first header bit is read are subsequently used to select data bit sampling times.

In example embodiment 62, the master clock, MCLK1, has a clock rate equal to the data bit rate. Two additional master clock signals, MCLK2 and MCLK3, are generated by phase shifting the MCLK1 120 and 240 degrees, respectively. The data bit sampling times are determined based on which clocks the first header bit is read. Depending on the propagation delay and signal timing uncertainties, the number of clocks or clock cycles where the header bit is read may be two, three, or four.

For both example embodiments, with a relationship between clock rate and data bit rate as discussed, four cases 64 of bit sampling are possible. These are illustrated in FIG. 5. In Case 64a, the first header bit is stretched as a result of propagation delay, as a result of which there are four detections. In Case 64b, the header bit is delayed relative to the master clock, resulting in three detections. In Case 64c, the signal is early relative to the clock edges, again resulting in 3 detections. In Case 64d, the pulse is short, resulting in only two detections. The data receiver decides which clock cycles to sample DOUT on using a decision rule determined by the detection of the header bits. Two decision rules are appropriate.

1) Sample at the times corresponding to the second detection of a 1; or

2) Sample at the times corresponding to the second to last detection of a 1.

When a single master clock is used, as in example embodiment 60, the corresponding times are the decision edges that are multiples of three clock cycles past the initially selected sampling time. Application of the selection rules is illustrated in Table I.

TABLE I

Embodiment 60. Read Value and Selected Sampling Times

| | Times | | | | | |
|---|---|---|---|---|---|---|
| | T0 | T1 | T2 | T3 | T4 | T5 |
| Case 1 | 0 | 1 | 1† | 1* | 1 | 0 |
| Case 2 | 0 | 0 | 1 | 1†* | 1 | 0 |
| Case 3 | 0 | 1 | 1†* | 1 | 0 | 0 |
| Case 4 | 0 | 0 | 1* | 1† | 0 | 0 |

†Sample at the times corresponding to the second detection of a 1.
*Sample at the times corresponding to the second to last detection of a 1.

In example embodiment 62, in which the phase shifted master clocks are used, the data signal is sampled at each rising edge of the selected sampling clock. Application of the selection rules is illustrated in Table II.

TABLE II

Embodiment 62, Sampling Times, and Selected Sampling Clocks

|  | CASE | | | |
| --- | --- | --- | --- | --- |
|  | 1 | 2 | 3 | 4 |
| MCLK1 | T1, T4 | T4 | T1 | (none) |
| MCLK2 | T2† | T2 | T2†* | T2* |
| MCLK3 | T3* | T3†* | T3 | T3† |

†Sample at the times corresponding to the second detection of a 1.
*Sample at the times corresponding to the second to last detection of a 1.

The rules insure the samples occurred as close to the center of the bit as possible to maximize the tolerance for variation in the channel propagation delay. If the propagation delay changes too much during a frame, of course the sampling times will no longer correspond with the appropriate bit, but may result in double sampling a bit, not sampling a bit, or falling on a transition between bits. Each circumstance may potentially result in errors.

If the frame size is predetermined, it must be known to both data transmitter and data receiver and should be such as to provide a likelihood of error that is acceptable based on expected propagation delay variations.

Operation of the Data Transmitter in an Example Embodiment

Figure 6:
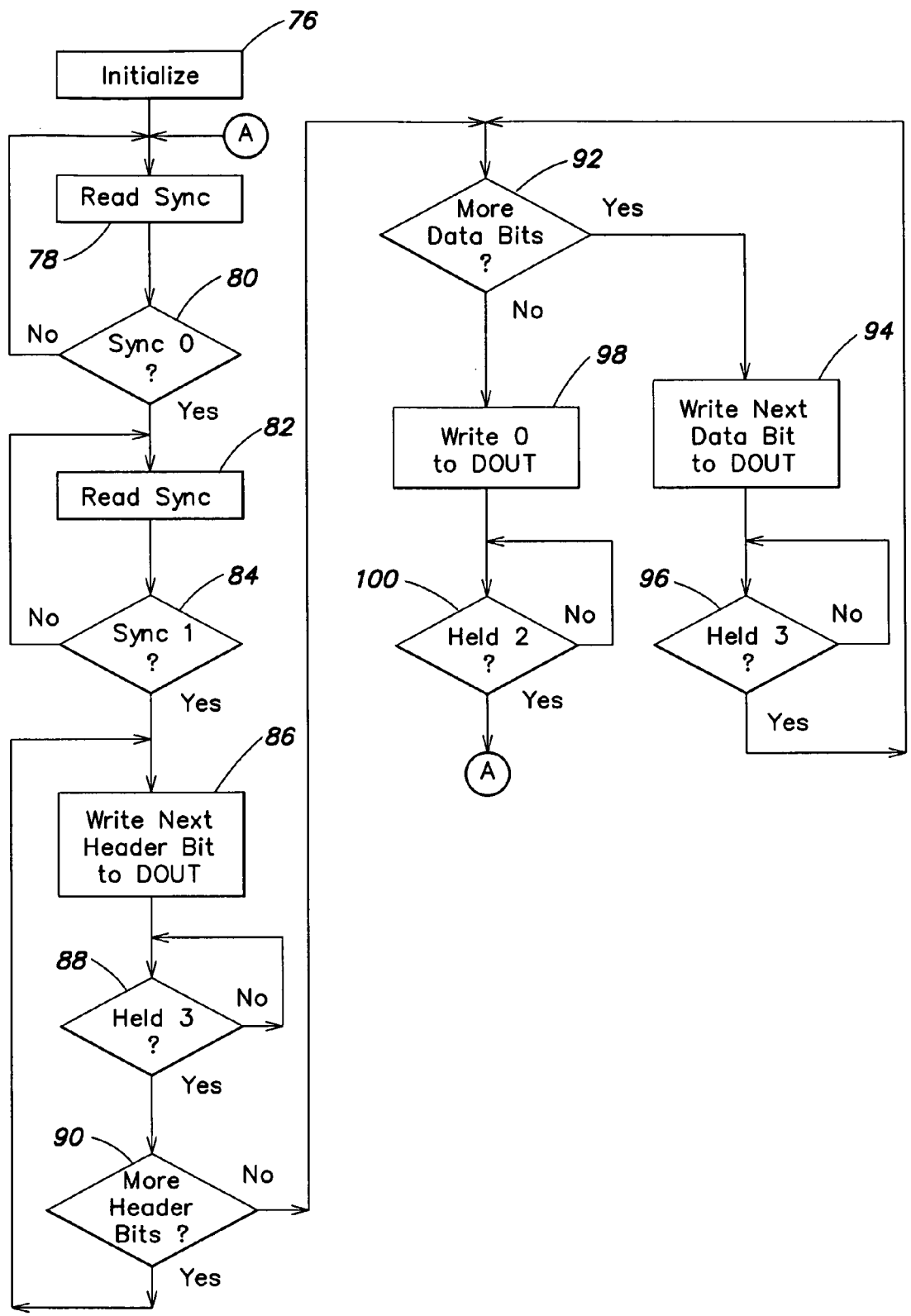
FIG. 6 is a flow chart describing the operation of an illustrative example of the data transmitter wherein the bit transmission rate is one-third the clock rate.

The operation of the data transmitter is further illustrated for an example embodiment as a flow chart in FIG. 6. This example embodiment assumes data is transmitted at a rate of one bit per three clock cycles, the binary header is 10, and the number of data bits in a frame is determined a priori to be M (M is 3 in FIGS. 5 and 6). A frame request is detected as a transition of the SYNC signal from 0 to 1.

The initialization step 76 begins when the receiver is turned on or reset. The initialization step includes setting DOUT to 0. The transmitter looks for a frame request by first reading SYNC (step 78) and determining if it is 0 (step 80). If SYNC is detected as 0 at step 80, on a subsequent read of SYNC (step 82), detected as a 1 (step 84), a frame is initialized. After the frame request is received, the first header bit is written to DOUT (step 86). This is held for three cycles at step 88. Since there are more header bits to be written (step 90), the next header bit, 0, is written upon returning to step 86.

After transmitting the header, data is written to DOUT. At step 92, the data transmitter determines if all the data bits to be transmitted for the frame have been sent. When more data needs to be sent, the next bit is written to DOUT at step 94. Step 96 insures that the data bit has been held for three cycles. If the Mth data bit has not been sent (step 92) the data transmitter returns to step 94.

After the Mth data bit has been transmitted, DOUT is set to 0 (step 98). Before looking for the next frame request, the data transmitter insures DOUT is held to 0 for at least two cycles (step 100). This insures proper detection of the header bit in the subsequent frames.

We describe the operation of the data receiver presently.

Operation of the Data Receiver as in the Example Embodiment

Figure 7:
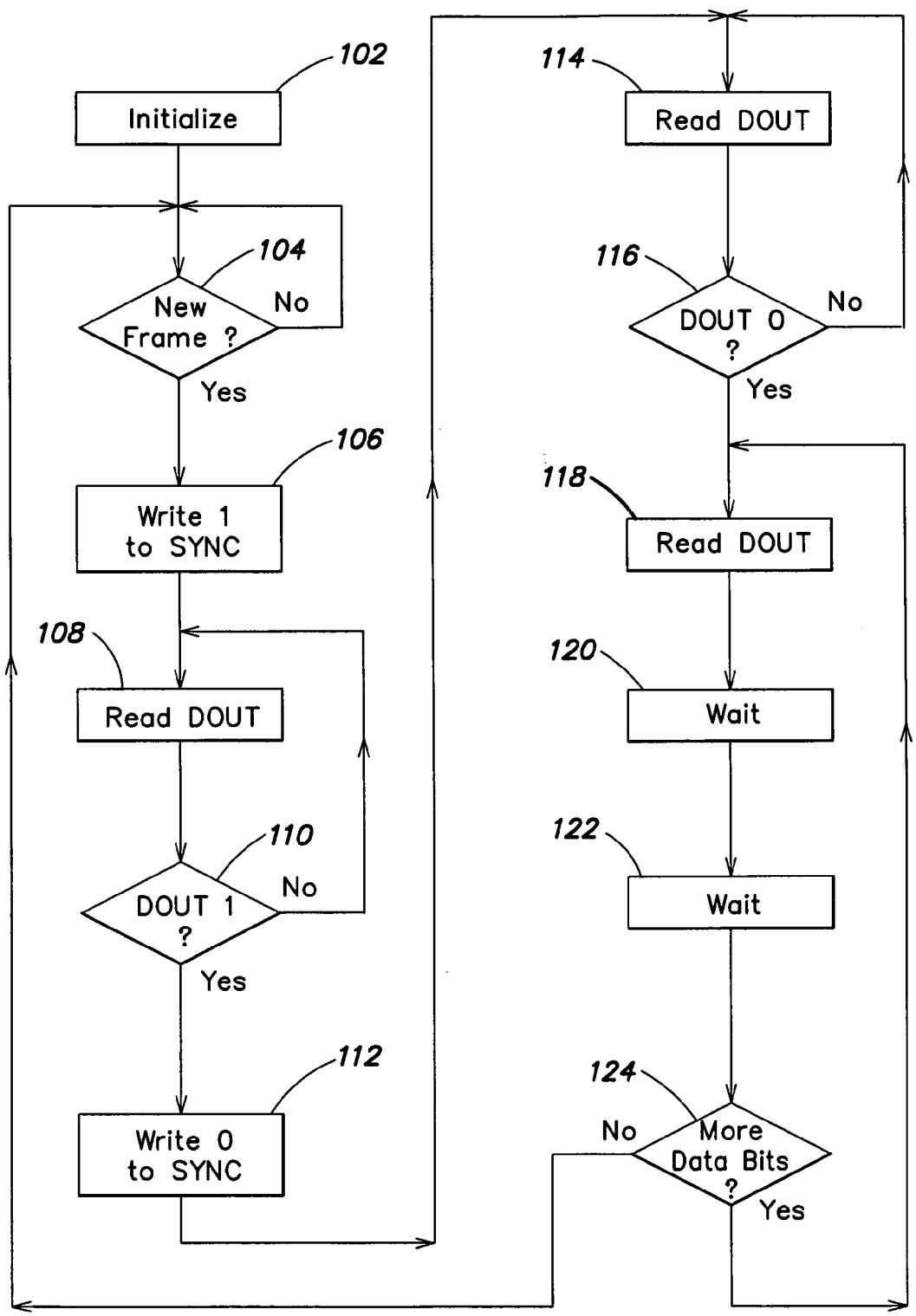
FIG. 7 is a flow chart describing the operation of an illustrative example of the data receiver wherein the bit transmission rate is one-third the clock rate.

The operation of the data receiver is further illustrated for the present example embodiment as the flow chart in FIG. 7. One skilled in the art will appreciate that the embodiment illustrated in the flow chart of FIG. 7 could be implemented in various ways, such as a FSM in a FPGA.

A master clock of the form illustrated in embodiment 60 is used. The initialization step 102 begins when the receiver is turned on or reset. The initialization step includes beginning transmission of the CLK signal, and writing 0 to SYNC (i.e., setting the SYNC signal value to 0. At step 104, the receiver waits for a request to transmit a new frame request. The frame request could come from other internal circuitry, or from ESYNC.

When it is determined to make a frame request, a value of 1 is written to the SYNC signal at step 106 (i.e., the SYNC signal is raised to a high, or 1, level). The receiver then reads the DOUT signal (step 108) each clock cycle until a 1 is read (step 110). This corresponds to time 66 in FIG. 5. This could be any of number of clock cycles past the time that the new frame request was sent at step 106, depending on the total signaling delay between the data receiver and data transmitter, and the time it takes for the data transmitter to respond.

Once a 1 is read on DOUT (step 110), a 0 is written to SYNC since the frame request has been acknowledged by the data transmitter (step 112). The data receiver continues reading DOUT (step 114), looking for a 0 (step 116). This corresponds to time 68 in FIG. 5. In this illustrative embodiment, the decision rule applied is "sample at the times corresponding to the second to last detection of a 1." The immediately subsequent clock cycle corresponds to a sampling time (time 70a) and at the corresponding step, step 118, DOUT is read. No action is necessary at steps 120 and 122, corresponding to times 72a and 74a, respectively, as the data receiver is now waiting for the next sampling time. Assuming the last data bit has not been read (step 124), operation returns to step 118 to read the next bit at time 70b. The cycle continues (reading at times 70c, 70d, etc.) until the Mth data bit in the frame has been read, after which the data receiver returns to step 104.

Note that the first execution of step 118 is a reading of the second header bit at time 70a. While, this is a superfluous read operation, it simplifies the flow chart.

Embodiments Where the Frame Size Determined by Data Receiver

If the end of a frame is determined by the data receiver, additional samples of the data signal should be taken to monitor the line for a changing the signal delay. For example, in Case 64a and Case 64d in FIG. 5, the rules for selecting the sampling times lead to different results. Both rules could be used with the frame allowed to extend until the samples disagree. For Case 64b and Case 64c, both rules result in the selection of the same sampling times. In both cases, three samples of the first header bit were made. By monitoring the data signal at all three times, until a disagreement is found on the first or third sampling time, and subsequently sampling on the remaining two until a disagreement exists, the frame length may be extended greatly.

When the frame size is determined by the data receiver, it is necessary that the data signal not include long stretches where the data is persistently 1s or 0s. Under these circumstance the receiver has no means of detecting changes in propagation delay, and may not accurately count the number of consecutive 1s or 0s. Coding mechanisms could be implemented by the data transmitter to avoid this circumstance.

Embodiment Using Multiple Sampling Clocks

Figure 8:
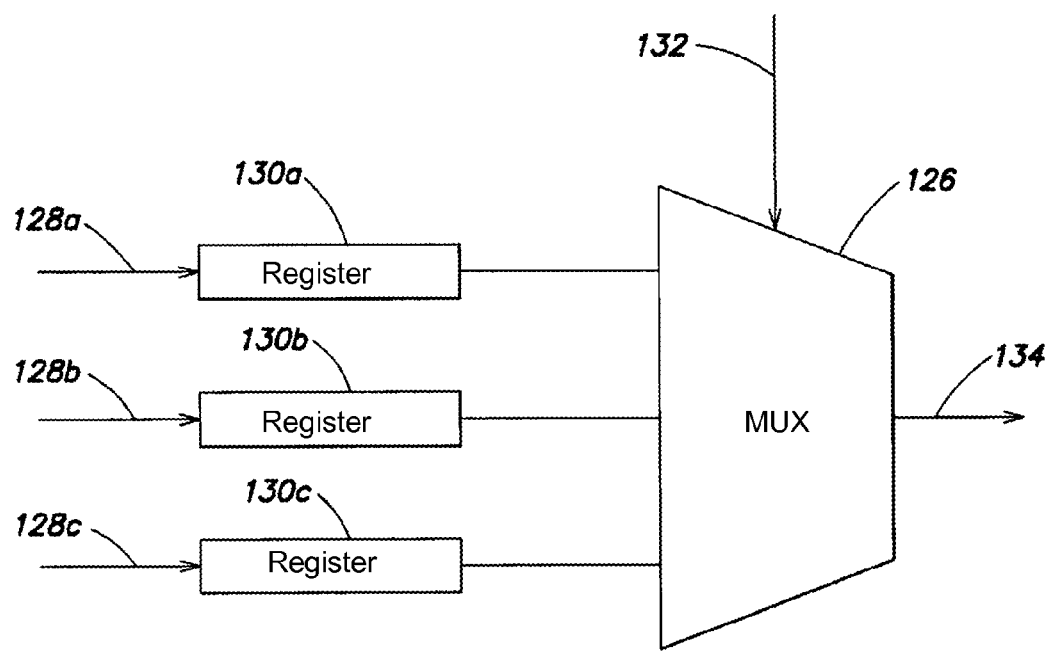
FIG. 8 is a simplified block diagram illustrating the selection of a sampling of DOUT, when DOUT is sampled multiple times during a bit cell, such as at times determined by three phase-shifted master clocks.

In another embodiment, three or more samples are taken at the data bit rate (i.e., per data cell), such as by three master clock signals, MCLK1, MCLK2, and MCLK3, each generated with the data bit rate. MCLK2, and MCLK3 may (but need not) be phase shifted versions of MCLK1 (for example, 120 and 240 degrees shifted relative thereto, respectively). In one embodiment, DOUT is sampled on each master clock, and the detections are recorded. Selection of the samples to use as data values may be done at a later time For example, as illustrated in FIG. 8, the samples of DOUT, 128a, 128b, and 128c, corresponding to MCLK1, MCLK2, and MCLK3 respectively, are fed into registers 130a, 130b, and 130c, respectively. The registers are connected to MUX 126, which is controlled by a control signal 132. Control signal 132 is driven by additional circuitry (not shown) that implements a decision algorithm as discussed above, to determine and select which of the master clocks should be used for choosing the sample for a particular data bit. The selected reading of DOUT is then written by the MUX to output signal 134.

Embodiments Wherein Synchronization is Initialized by the Data Transmitter

It is envisioned that in some embodiments, a data transmitter may indicate to the data receiver that it is sending (or about to send) a frame of data, via the synchronization signal. Thus, in such embodiments it is the transmitter, rather than the receiver, that generates the synchronization signal. Upon receiving the synchronization signal from the data transmitter, the date receiver detects the frame header and data on DOUT. Such an embodiment is appropriate, for example, when a data transmitter, having collected a certain amount of data, determines it is an appropriate time to deliver the data to a data receiver. Alternatively, a transmitter may include a timer that triggers generation of a synchronization signal.

Having thus described the inventive concepts and certain example implementations of possible embodiments for practicing one or more of those inventive concepts and aspects, it will now be apparent to those skilled in the art that the invention's aspects may be implemented in various other ways. Such other implementations as will naturally occur to those skilled in the art, within and not departing from the spirit of the invention, are intended to be suggested and covered by this disclosure. Accordingly, the invention is not to be limited to or by the examples discussed, but only by the appended claims and equivalents to them.

We claim:

1. A method for serial communication of binary signals between a data transmitter and a data receiver, the binary signals varying between a first logic level representing a first binary value and a second logic level representing a second binary value, comprising:
   transmitting a clock signal from the data receiver to the data transmitter over a clock channel, the clock signal having a predetermined clock cycle;
   transmitting a synchronization signal from the data receiver to the data transmitter over a synchronization channel; and
   receiving the binary data signals at the data receiver over a data channel, the binary data signals being received in a frame that includes a header code and followed by a plurality of data bits, each bit of the header code and the data bits having a width of multiple predetermined clock cycles, the receiving including:
      sampling the data channel periodically based on the predetermined clock cycle, including sampling a first header bit at a plurality of times;
      determining data bit sampling times for other data bits in the frame, the determined data bit sampling times being chosen from a pattern of the sampled first header bit signals, wherein determining data bit sampling times for other data bits in the frame includes:
         counting a total number of samples indicative of detection of the first header bit; and
         in response to said count, establishing sampling times for remaining data bits in the frame based on one of two rules: sampling at the times corresponding to a second detection of the first header bit, and sampling at the times corresponding to a second to last detection of the first header bit; and
      detecting at the data receiver at said data bit sampling times the logic value of each said data bit.

2. The method of claim 1 wherein each bit is transmitted in a signal width of at least three predetermined clock cycles.

3. The method of claim 1 wherein the data transmitter initializes transmission of a frame in response to detecting a change in the logic level of the synchronization channel indicative of a request to initialize a frame.

4. The method of claim 3, wherein the data transmitter terminates transmission of the frame upon detecting a further change of the logic level of the synchronization channel.

5. The method of claim 1 wherein the data signals include an encoded frame length within or after the header code.

6. The method of claim 1 wherein detecting the header code at the data receiver comprises:
   producing a plurality of master clocks each phase-shifted a predetermined phase and each having a clock rate equal to a data bit rate determined by the data signal width;
   sampling the data signals according to each of the master clocks; and
   selecting one of the master clocks as the sampling clock for subsequent data bits in the frame and sampling data bits according to the selected master clock.

7. The method of claim 1 further comprising the steps of:
   receiving a clock signal, referred to as the external clock signal, from an external source;
   determining if the clock rate of the external clock signal exceeds a predetermined minimum rate and if so, reproducing the external clock signal as an internal clock signal for use in the receiver, and otherwise producing an internal clock signal for use in the receiver by generating a clock signal whose rate exceeds said predetermined minimum rate; and
   using the internal clock signal in producing the clock signal transmitted to the transmitter.

8. A data receiver for receiving a serial communication of binary signals in a frame from a data transmitter, said frame including one or more header bits and one or more data bits, and for decoding the received binary signals into binary data to determine the bits that were transmitted, comprising:
   a clock generator which provides a clock signal of a predetermined clock rate to the transmitter over a clock channel;
   a synchronization signal source which provides to the transmitter over a synchronization channel a synchronization signal for initiating a frame; and
   a state machine that receives the serial communication over a data channel, detects a first header bit of the header code a plurality of times, determines data bit sampling times for sampling the serial communication to decode the data bits thereof, and samples at the data bit sampling times, the logic level of the received serial communication and provides corresponding data bit values,
   wherein the state machine determines data bit sampling times by selecting a sampling time from among a finite plurality of potential sample times according to the plurality of times of detection of the first header bit, to sample proximate the nominal middle of a received bit value, and wherein the state machine is adapted to sample the received serial communication at the predetermined clock rate, count the number of detections of the first header bit, and determine therefrom the data bit sampling times based on one of two rules: sampling at the times corresponding to a second detection of the first header bit, and sampling at the times corresponding to a second to last detection of the first header bit.

9. The data receiver of claim 8 wherein the clock generator provides the clock signal at at least three times at the bit rate at which the transmitter transmits bits in the serially communicated binary signals.

10. The data receiver of claim 8 wherein the synchronization signal source requests a frame from the transmitter by changing a logic level of the synchronization signal.

11. The data receiver of claim 8 wherein the synchronization signal source requests a frame from the transmitter by changing the synchronization signal from a first logic level to a second logic level, and requests the termination of the frame by changing the synchronization signal from the second logic level to the first logic level.

12. The data receiver of claim 8 wherein to detect the header code, the state machine is adapted to produce additional clocks by phase shifting a master clock with a clock speed equal to the data bit rate; sample the data signal on each clock; and select either the master clock or one of the additional clocks to specify the data bit sampling times based on one of two rules: sampling at the times corresponding to a second detection of the first header bit, and sampling at the times corresponding to a second to last detection of the first header bit.

13. A data receiver, comprising:
a clock generator to provide a clock signal at a predetermined clock rate to a data transmitter; and
a receiver circuit for serial communication of binary signals in a frame from the data transmitter, the frame including one or more header bits and one or more data bits, the receiver circuit to:
sample logic levels periodically based on the predetermined clock cycle,
detect a first header bit at a plurality of sampling times,
determine data bit sampling times for sampling a remainder of the frame, and
sample logic levels of the rest of the received serial communication at the determined data bit sampling times to provide corresponding data values,
wherein the data bit sampling times are selected to sample at an estimated middle portion of a received bit, and
wherein to detect the first header bit, the receiver circuit is configured to sample the received serial communication at the predetermined clock rate, count the number of detections of the first header bit, and determine therefrom the data bit sampling times based on one of two rules: sampling at the times corresponding to a second detection of the first header bit, and sampling at the times corresponding to a second to last detection of the first header bit.

14. The data receiver of claim 13, wherein the clock generator provides the clock signal at at least three times at the bit rate at which the data transmitter transmits bits in the serially communicated binary signals.

15. The data receiver of claim 13, further comprising a synchronization signal source to provide a synchronization signal to the data transmitter, wherein the synchronization signal source requests a frame from the data transmitter by changing a logic level of the synchronization signal.

16. The data receiver of claim 13, further comprising a synchronization signal source to provide a synchronization signal to the data transmitter, wherein the synchronization signal source requests a frame from the data transmitter by changing the synchronization signal from a first logic level to a second logic level, and requests termination of the frame by changing the synchronization signal from the second logic level to the first logic level.

17. The data receiver of claim 13, wherein to detect the first header bit, the logic is configured to produce additional clocks by phase shifting a master clock with a clock speed equal to the data bit rate; sample the data signal on each clock; and select either the master clock or one of the additional clocks to specify the data bit sampling times based on one of two rules: sampling at the times corresponding to a second detection of the first header bit, and sampling at the times corresponding to a second to last detection of the first header bit.

18. The data receiver of claim 13, wherein the logic is implemented as a finite state machine.

* * * * *